UNITED STATES PATENT OFFICE.

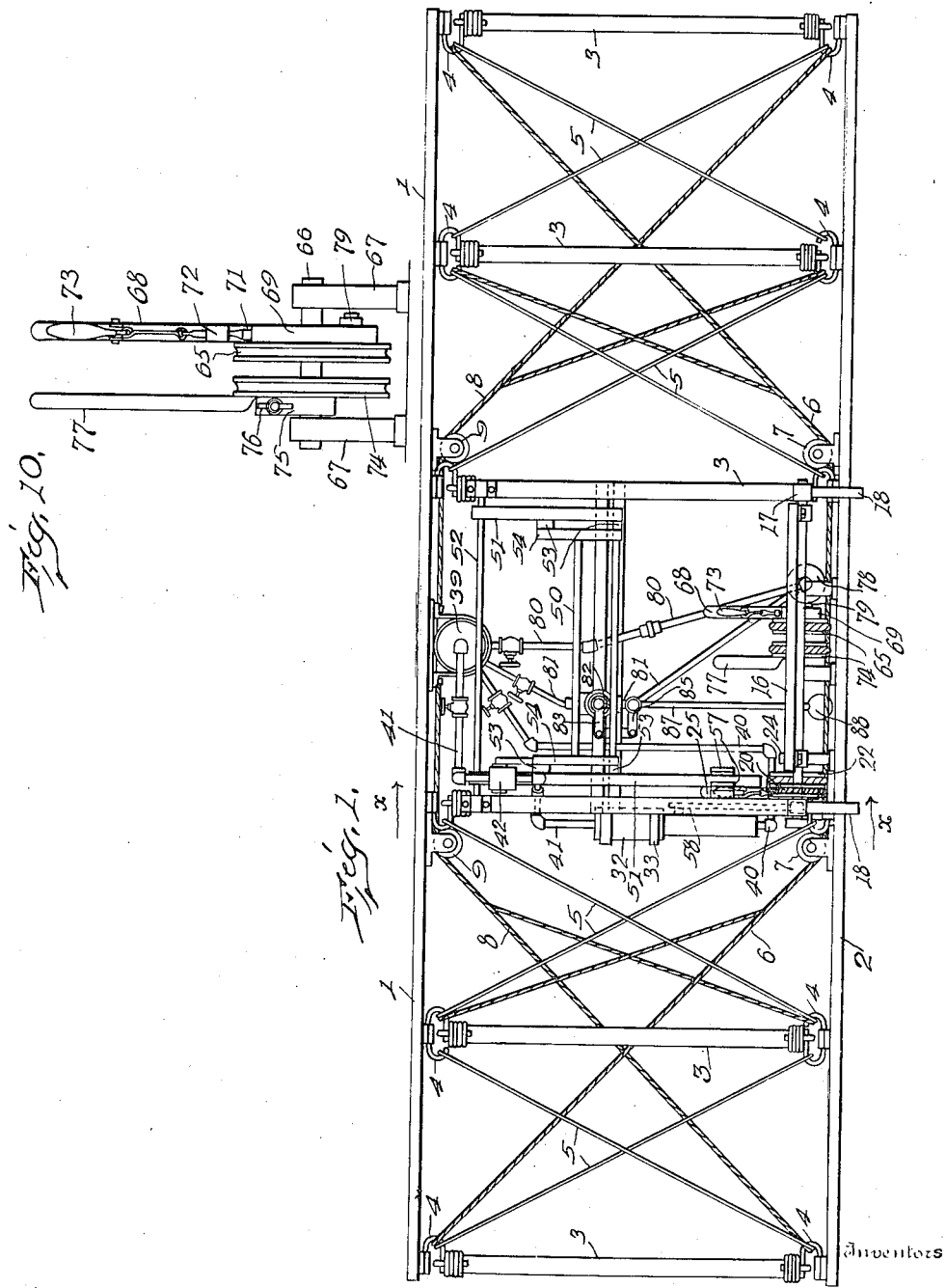

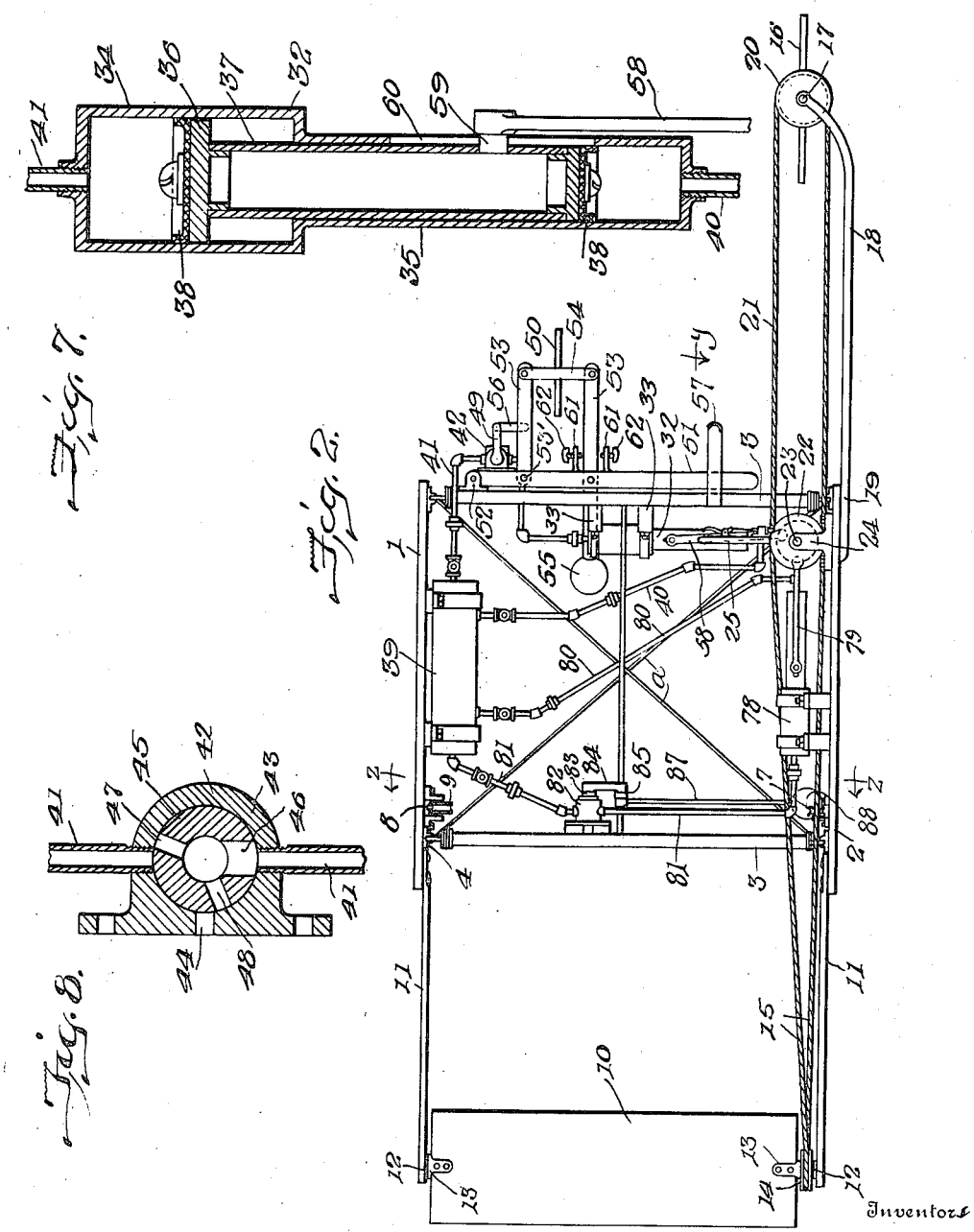

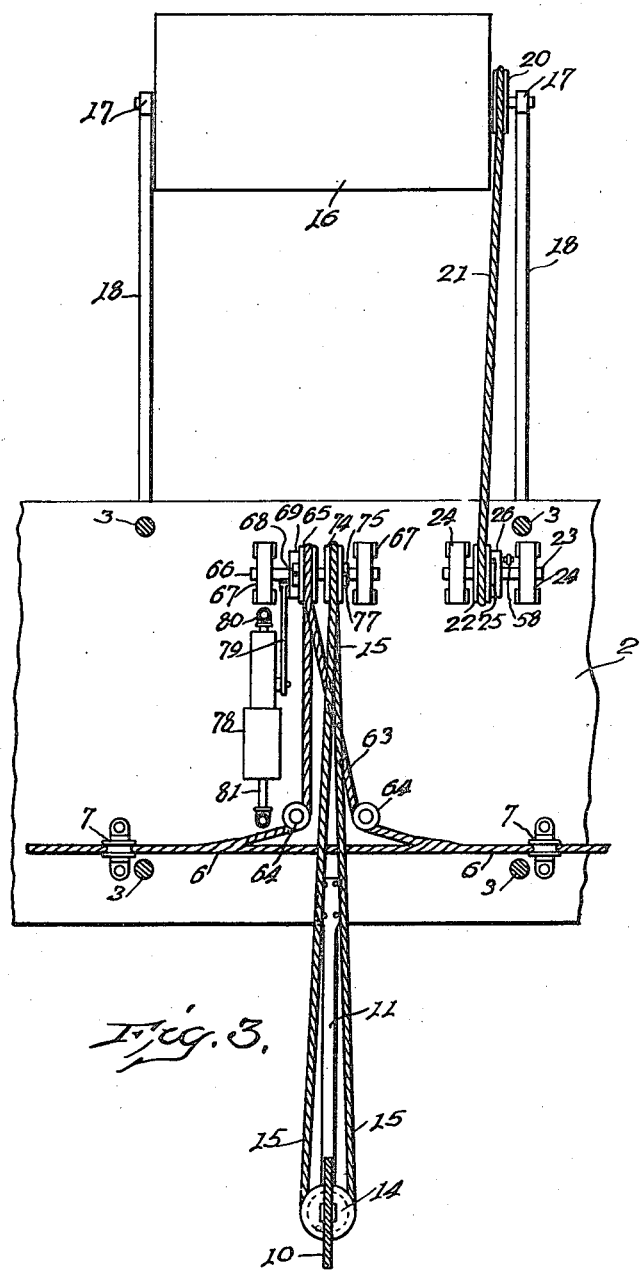
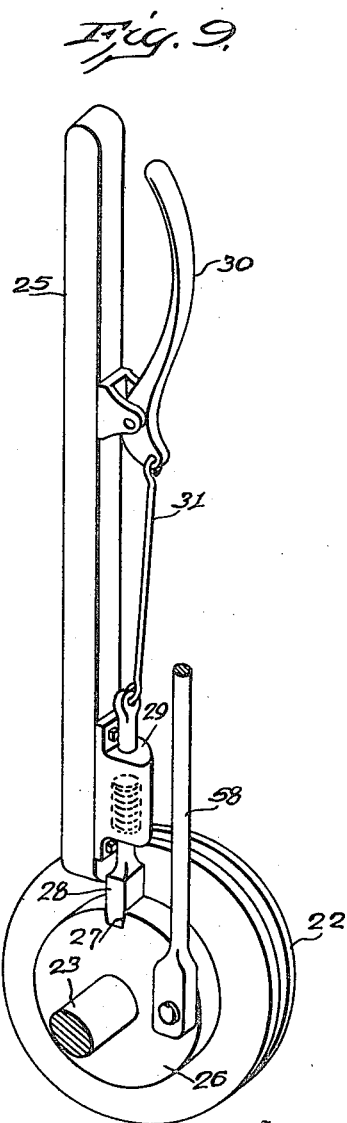

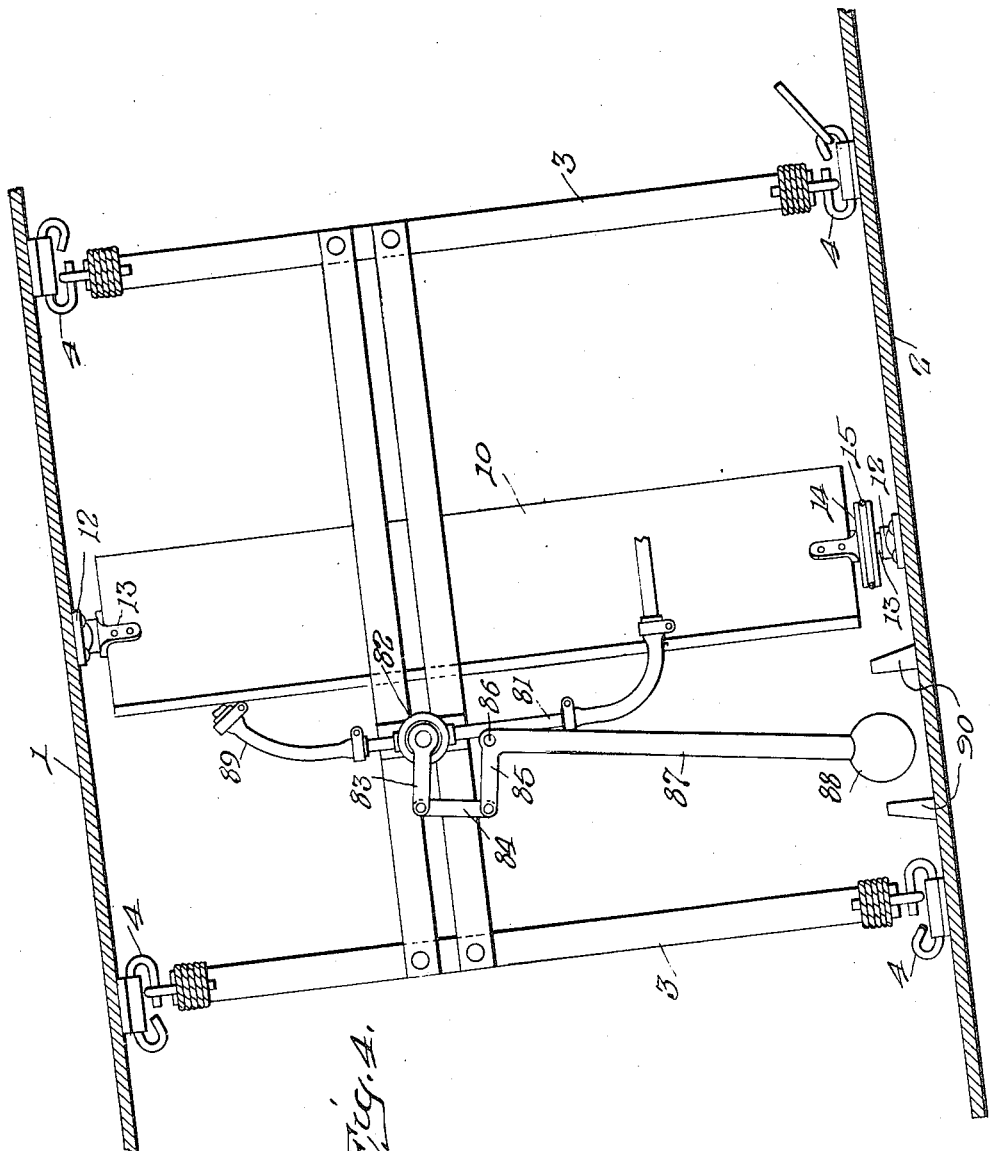

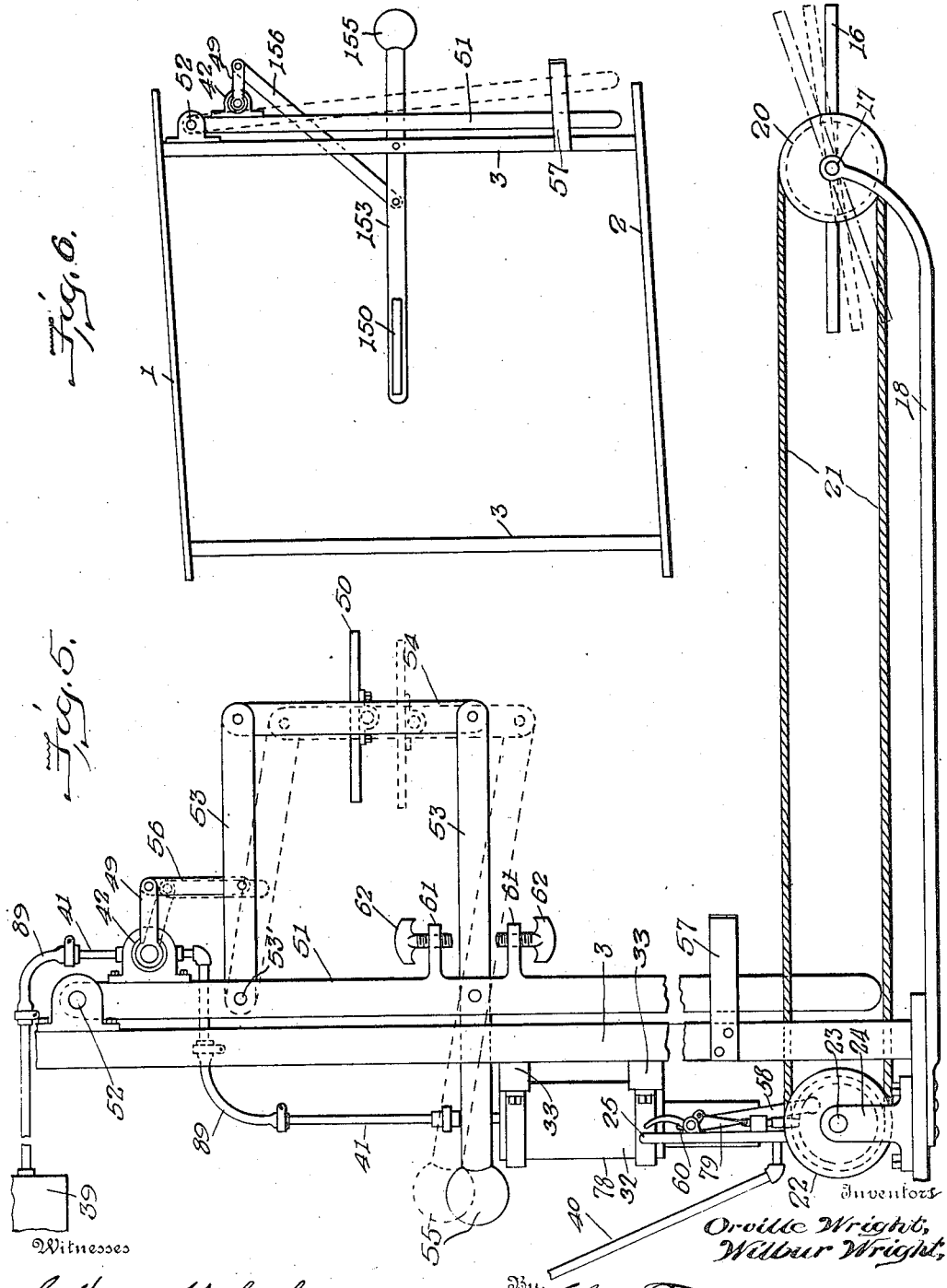

ORVILLE WRIGHT AND WILBUR WRIGHT, OF DAYTON, OHIO, ASSIGNORS TO THE WRIGHT COMPANY, A CORPORATION OF NEW YORK.

FLYING-MACHINE.

1,075,533.  Specification of Letters Patent.  Patented Oct. 14, 1913.

Application filed February 10, 1908. Serial No. 415,105.

*To all whom it may concern:*

Be it known that we, ORVILLE WRIGHT and WILBUR WRIGHT, citizens of the United States, residing at Dayton, in the county of Montgomery and State of Ohio, have invented certain new and useful Improvements in Flying-Machines, of which the following is a specification, reference being had therein to the accompanying drawings.

The present invention relates to that class of flying machines in which the weight is sustained by the reactions resulting when one or more aeroplanes are moved through the air edgewise at a small angle of incidence, either by the application of mechanical power or by the utilization of the force of gravity.

The object of the invention is to provide automatic controlling mechanism for maintaining the balance of the machine about longitudinal, lateral and vertical axes.

With this object in view our invention consists in certain novel features of construction and in certain parts and combinations hereinafter to be described, and then more particularly pointed out in the claims.

In the accompanying drawings, Figure 1 is a front elevation of a flying machine embodying our invention; Fig. 2 is a transverse section, taken on the line $x$ $x$ of Fig. 1 and looking in the direction of the arrows; Fig. 3 is a horizontal sectional view, taken on the line $y$ $y$ of Fig. 2 and looking in the direction of the arrows; Fig. 4 is a vertical sectional view of a portion of the machine, taken on the line $z$ $z$ of Fig. 2 and looking in the direction of the arrows; Fig. 5 is a detail view of the air cylinder and its controlling vane; Fig. 6 is a detail view of a modified form of controlling vane; Fig. 7 is a longitudinal sectional view of one of the air cylinders and piston; Fig. 8 is a transverse sectional view of one of the three-way valves controlling the passage of air from the tank to the cylinder; Fig. 9 is a detail view of the drum for actuating the horizontal rudder; and Fig. 10 is a detail view of the drums for actuating the opposite lateral portions of the aeroplanes and the vertical rudder.

In these drawings, we have illustrated the preferred form of our invention and have shown the same as embodied in a flying machine of the general type shown and described in Patent No. 821,393 for flying machines, granted to us May 22, 1906, but it is obvious that the detail construction and arrangement of this embodiment of the invention could be varied, and that the same could be applied to any flying machine having operable parts for controlling its equilibrium, whether these parts consist of adjustable surfaces or rudders, or of movable counterbalancing weights.

The machine herein shown consists of two superposed aeroplanes, 1 and 2, connected one to the other by means of rigid upright members 3, the upright members being preferably connected at their opposite ends to the respective aeroplanes by means of suitable flexible joints 4, that herein shown consisting of a hook and eye carried respectively by the aeroplane and the upright member. These aeroplanes preferably consist of a frame of light flexible material, substantially rectangular in shape and of considerably greater length in the direction transverse to the line of flight of the machine than in the direction of the line of flight. These frames are provided with a suitable covering of fabric or the like. Suitable truss rods 5 extend between the aeroplanes and are arranged along the forward margins thereof and are preferably provided with flexible connections between the same and the aeroplanes, the connection being here shown as a hook and eye, the hooks forming part of the connecting members 4, by means of which the upright members 3 are secured to the aeroplanes. Near the center of the machine truss rods $a$ are provided, which fix the fore and aft position of the upper and lower aeroplanes in relation to each other. The rear margins of the opposite lateral portions of the aeroplanes are connected by the upright members 3, and are immovably trussed only in the central portions.

A twist may be imparted to the aeroplanes in any suitable manner, but we prefer that herein shown which consists in providing a suitable cable 6 which is secured at its opposite ends to the opposite lateral portions of the upper aeroplane near the rear margin thereof and the central portion of which extends about guides 7. The opposite ends of the cable are preferably bifurcated, as shown in Fig. 1, and connected at different points along the rear margins of the lateral portions of the aeroplanes, thus distributing the strain along a considerable portion of the aeroplane and causing the same to twist uniformly and avoid the liability of the frame buckling. A second cable 8, similar to the cable 6, is secured to the rear margins of the opposite lateral portions of the lower aeroplanes and extends about suitable guides 9 secured to the upper aeroplane. These cables are of such a length that when their opposite ends are connected to the aeroplane and their central portions passed about the guides, the cables 6 and 8 will be drawn taut. One of these cables is provided with suitable means for operating the same and we have here shown this operating mechanism as connected to the cable 6, which passes about the guides 7 on the lower aeroplane. Thus, it will be seen that when this mechanism is actuated to move the cable 6 to the left, the rear margin of the right-hand portion of the upper aeroplane will be drawn downwardly, and, through the medium of the rigid connecting members 3, the corresponding portion of the lower aeroplane will likewise be moved downwardly. The downward movement of the lower aeroplane draws the cable 8 from left to right, thus moving the rear margin of the left-hand portion of the lower aeroplane upwardly, and, through the medium of the connecting members 3, the corresponding portion of the upper aeroplane is also moved upwardly, thereby imparting a helicoidal twist to both aeroplanes and causing the opposite lateral portions thereof to be presented to the air at different angles of incidence. By adjusting the twist given to the opposite lateral portions of the aeroplanes, the angle of incidence at which the same are presented to the atmosphere may be increased or decreased, as may be necessary to maintain the lateral balance of the machine. The opposite lateral portions of the aeroplanes being presented to the atmosphere at different angles of incidence also offer different resistances to the forward movement of the corresponding portion of the aeroplanes, which causes one end of the machine to travel at a greater rate of speed than the other, thereby disturbing the balance of the aeroplanes about a vertical axis. To counteract this tendency, we provide means for creating a turning force in the opposite direction. This means may be of any kind, but we prefer a vertical rudder. This rudder, which is shown at 10, is preferably mounted in the outer ends of rearwardly extending arms 11 which are secured at their inner ends to the upper and lower aeroplanes, respectively, near the center thereof and are provided at their outer ends with suitable bearings 12 adapted to receive the stud shafts carried by the brackets 13 provided at the opposite ends of the vertical rudder 10. A suitable drum or pulley 14 is provided, preferably on the bracket 13 at the lower end of the rudder, and is adapted to receive a cable 15 which extends about the same and inwardly to a point within reach of the operator, where it is provided with suitable means for actuating the same and adjusting the rudder 10.

In order to regulate the rise and fall of the machine or to cause the same to travel in the desired horizontal plane, it is desirable that the angle of incidence at which the aeroplanes as a whole are presented to the atmosphere be varied. Suitable mechanism is, therefore, provided for governing the inclination of the main aeroplanes. This mechanism is, in the present instance, shown as a horizontal rudder 16 which is journaled in suitable bearings 17 formed in the outer ends of the forwardly extending struts or rods 18 which are secured at their inner ends, preferably, to the lower aeroplane, at points on the opposite sides of the center thereof, as shown at 19. A suitable drum or pulley 20 is secured to the rudder 16 and is adapted to receive a cable 21 which extends about the same and inwardly to a point within the reach of the operator, where it is provided with suitable operating mechanism for adjusting the position of the rudder.

In the form of the invention herein shown, the cable 21 operating the horizontal rudder 16, is passed about a suitable drum or pulley 22 rigidly mounted on the shaft 23, which, in turn, is mounted in suitable brackets 24, preferably mounted on the lower aeroplane, the drum 22 being provided with a suitable operating handle 25 for actuating the same to control the position of the rudder 16. It is also provided with suitable clutch members for rigidly securing the same to a suitable driving disk 26. This disk is loosely mounted on the shaft 23 and is provided in its periphery with a notch 27, adapted to receive a dog 28 which is slidably mounted in a suitable bracket 29 on the handle 25 and is provided with suitable means for actuating the same, such as the handle 30 and connecting links 31. Thus, the drum 22 can be actuated to adjust the rudder 16 by hand, or the same may be positively connected to the automatically actuated mechanism which is to be hereinafter described. By adjusting this rudder, the machine including its main aeroplanes may be brought to any desired inclination.

A fluid pressure cylinder 32 is herein shown as mounted on suitable transverse members 33, secured to members extending between the margins of the aeroplane, and comprises an enlarged portion 34 and a reduced portion 35. The enlarged portion 34 is provided with a suitable piston 36 which in turn has a member 37 having an exterior diameter slightly less than the interior diameter of the reduced portion 35 of the cylinder and adapted to serve as a piston rod for the piston 36 and as a piston for the reduced portion 35 of the cylinder, both pistons being provided with outwardly turned flexible cups 38. Suitable means are provided for connecting the piston with the drum 22 which operates the rudder 16. This connection may be made in any suitable manner, but we prefer the means herein shown which consists in providing a crank arm 58 which is suitably connected to the disk 26, which, in turn, is adapted to be connected to the drum 22, said arm being provided at its opposite end with a wrist pin 59 adapted to extend through a slot 60, preferably formed in the wall of the reduced portion 35 of the cylinder, and engage the piston 37, thus causing the drum 22 to be rotated as the pistons 36 and 37 reciprocate within the cylinder 32. The reduced portion 35 of the cylinder is connected with an air storage receptacle 39, which is preferably supported from the upper aeroplane, by means of a pipe 40, which pipe is normally in open communication with both the cylinder and the air storage tank 39. A constant air pressure is therefore exerted on the piston 37. The enlarged portion 34 of the cylinder is connected with the air tank 39 by means of a pipe 41, which is provided at a point between the cylinder 34 and the tank 39, with a three-way valve 42 adapted to be automatically controlled to regulate the admission of air to the cylinder. This three-way valve preferably consists of a valve casing 43, provided at its upper and lower ends with suitable connections for the pipe 41 and provided on one side thereof with an exhaust passage 44. A plug or valve member 45 is rotatably mounted within the casing 43 and is provided with three ports, one of which, the port 46, is of such a size that it is at all times in communication with the outlet portion of the pipe 41. The ports 47 and 48 are so arranged that the valve member 45 may be turned to bring either the port 47 into alinement with the inlet portion of the pipe 41, or the port 48 into alinement with the exhaust port 44 in the casing 43, or the valve member may be turned so as to move both of the ports 47 and 48 out of alinement with the respective ports of the casing, thus closing the outlet pipe 41 against the passage of the fluid and locking the piston against movement. The valve member 45 is provided with a suitable operating handle or arm 49 which is adapted to be connected to the automatic controlling mechanism.

A flying machine is in equilibrium only when the center of the lifting pressure is in the same vertical line as the center of gravity. But the location of the center of pressure is dependent upon the angle of inclination of the aeroplane to the wind, and varies with each change in the angle of inclination. On the other hand every change in the location of the center of pressure disturbs the balance of the machine and tilts the aeroplanes to a different angle. Thus effects become causes in turn. The trouble grows very rapidly, and, unless promptly corrected, results in a complete overturning of the whole machine. We aim to control the trouble by detecting the changes in the angle of incidence at the moment they occur, and, by introducing independent controllable forces, to bring the machine back to the original angle of incidence before the balance of the machine has had time to become seriously affected. We prefer to attain this by means of automatic mechanism.

The automatic controlling mechanism preferably consists of a small horizontal plane 50, mounted upon the frame of the machine at a small negative angle with reference to the main aeroplanes, in such a manner as to permit the same to have a limited vertical movement, and so connected to the arm 49 of the valve member 45 as to actuate the valve as the regulating plane moves up or down. But in order to cause the machine to rise or descend or to maintain an approximately horizontal course, it is necessary to change the angle between the regulating plane and the main aeroplane. Means of adjustment of some kind, which will permit the angle between the small regulating plane and the main aeroplanes to be varied at the will of the operator while the machine is in flight, is therefore desirable. We therefore prefer to mount this plane in the manner herein shown, which consists in providing one or more arms 51, which are rigidly mounted on a shaft 52 pivotally connected to the frame of the machine and which extend downwardly substantially parallel with the upright members 3. Pivotally connected to each of the arms 51 are links 53, which are approximately parallel and extend outwardly from the arms 51 and the frame of the machine and support between their outer ends the plane or vane 50. As herein shown, each of the arms 51 is provided with two links 53, spaced a slight distance one above the other, and pivotally connected at their outer ends by a connecting member 54, and the vane 50 is rigidly mounted between the connecting members 54. The two upper links 53 are rigidly mounted on a shaft 53'. The vane 50 may be mounted upon a single arm, in which case its angle to the main aeroplanes would be slightly altered with any movement up or down; but we prefer to mount it upon parallel arms so that its angle to the main aeroplanes is not affected by such movement. A suitable counterbalance is provided for the vane 50 and the supporting frame and this counterbalance is preferably provided by extending one or more of the links 53 rearwardly beyond the arm 51 and providing the same with suitable weights 55. The frame supporting the vane 50 is connected to the arm 49 of the valve 42 in any suitable manner. As herein shown, one of the upper links 53 of this frame is connected to the arm 49 by means of a pivoted connecting bar or link 56. Suitable means are also provided for adjusting the frame and the vane 50 carried thereby relatively to the aeroplanes and for securing the same in adjusted position. The pivotal supports for the arms 51 permit a frame supporting the vane 50 to be moved relatively to the main frame of the machine and thus adjust the vane 50 so that its plane forms any desired angle with the plane of the main aeroplanes. A suitable friction clutch is preferably provided for securing the arms 51 in their adjusted position, and, in the form herein shown, this locking mechanism is provided by extending one of the arms 51 downwardly to form a handle and the lower end of this handle is adapted to engage a suitable clutch or gripping device, such as the spring clip 57, the frictional engagement between the handle and the gripping device being such as to secure the arms 51 and the vane 50 in their adjusted position and prevent the accidental displacement thereof. If desired, suitable stops may be provided for limiting the movement of the links 53 and the vane 50. As here shown, these stops consist of lugs 61 extending outwardly on opposite sides of one of the members 53 and provided with suitable adjustable stops, such as the set screws 62, by the adjustment of which the maximum rise and fall of the vane 50 can be readily adjusted.

In use the vane 50 is adjusted by means of the handle provided at the lower end of one of the arms 51, to such angle with the main aeroplanes as it is desired that the aeroplanes shall maintain with the relative wind. If the relative wind at any time strikes the aeroplanes at an angle of incidence greater than the angle between the aeroplanes and the regulating vane 50, it also strikes the vane on the under side and forces it upward and rotates the valve member 45 to bring the inlet port 47 in alinement with the pipe 41, thus permitting the air from the storage tank 39 to pass into the enlarged portion 34 of the cylinder 32. The difference in the area of the piston 36 in the cylinder 34 and the piston 37 in the cylinder 35 is such that the air pressure in the cylinder 34 overcomes that in the cylinder 35 and moves both pistons longitudinally of the cylinder, thus actuating the crank arm 58 and rotating the drum 22 to adjust the rudder 16 to such a position as to cause the forward end of the machine to move downwardly, thus decreasing the angle of incidence of the aeroplanes and also of the vane 50 and causing the air currents to come in contact with the upper surface of said vane. The pressure of the air upon the upper surface of the vane moves the same downwardly, as shown in dotted lines in Fig. 5, and reverses the valve member 45, thus bringing the exhaust port 48 in alinement with the exhaust outlet 44, thereby opening the enlarged portion 34 of the cylinder to the atmosphere and permitting the air pressure within the reduced portion 35 to raise the piston, and, through the medium of the crank arm 58 and drum 22, to move the rudder 16 in the opposite direction, thus again moving the aeroplanes to an increased angle of incidence. These operations are repeated successively until the movement of the vane 50 has been gradually reduced and the vane has but a very limited movement. Under normal conditions there will be an almost constant movement of the vane 50, but this movement, except in turbulent winds, will be slight. The particular angle of incidence of the air currents to the aeroplane at which the pressure changes from one side of the vane to the other we have denominated the critical angle of incidence. This angle is always equal to the angle of the vane to the aeroplane, and is the particular angle at which the aeroplane is automatically maintained by the mechanism already described. Therefore, by providing means for varying the angle of the vane to the aeroplane, we have provided means for varying the particular angle of incidence at which the aeroplane is automatically maintained, and thus have enabled the driver to direct the machine along a rising or a descending course without interrupting the working of the automatic-controlling mechanism.

In Fig. 6 we have shown a modified form of the controlling vane and arrangement for varying the angle of incidence. In this form of the device, the vane 150 is rigidly mounted near the inner ends of a single pair of levers or arms 153, which are pivotally mounted between their ends on the uprights 3 and are provided on their outer ends with counterbalancing weights 155. The arms 153 are connected with the valve arm 49 by means of a link or connecting rod 156 pivoted to the arms 153 at a point between their pivotal centers and their inner ends. The vane 150 is actuated by air currents which strike its upper side or lower side according as the angle of incidence of the air currents on the aeroplane becomes less or greater than the angle of the vane to the aeroplane. The vane 150 acting through the links 153, the connection 156, and the valve arm 49, rotates the valve member 45 to one side or the other of the neutral position, and causes the aeroplane to be automatically maintained at a definite angle of incidence. If the arm 51 is adjusted to a new position by the operator, as shown by the dotted lines, the angle of the vane to the aeroplane will not be directly affected, since the arms 153 are mounted upon the uprights 3. But the valve member 45 will be rotated away from the neutral position, and the aeroplane will not be automatically maintained at the original angle of incidence, but brought to and maintained at a new one. Means are thus provided for varying the angle of incidence at which the aeroplane will be automatically maintained, without interrupting the operation of the automatic mechanism.

As hereinbefore stated, any suitable means may be provided for adjusting the twist of the opposite lateral portions of the aeroplanes and for compensating inequalities in the resistance of the right and left wings when adjusted to different angles with reference to each other. The means for accomplishing this result, which is herein shown, consists in providing the cable 6, which is connected to the opposite lateral portions of the upper aeroplane, with a short cable 63, the opposite ends of which are connected to the cable 6 at points within the guides 7. The cable 63 passes about suitable guides 64 and has its central portion extending about a drum or pulley 65, which is mounted on a suitable shaft 66 journaled in suitable brackets 67, preferably mounted on the frame of the lower aeroplane. The drum 65 is solidly mounted on the shaft 66 and is provided with a handle 68 for actuating the same and is also provided with suitable clutch mechanism for positively connecting the same to a disk 69. The disk 69 is loosely mounted on the shaft 66 and provided with a recess adapted to receive a dog 71 slidably mounted in a suitable guide 72 on the handle 68 and provided with a suitable operating handle 73. The cable 15, which operates the vertical rudder 10 extends about a drum 74, which is loosely mounted upon the shaft 66 adjacent to the drum 65 and is provided with a friction clutch for securing the same to said shaft in its adjusted position. This friction clutch preferably consists of a split collar 75 rigidly secured to the drum 74 and provided with a suitable bolt and thumb nut 76 for clamping the same about the shaft 66. The drum 74 is also provided with an operating handle 77. For automatically operating the drums 65 and 74, we provide an air cylinder 78, similar in construction to the cylinder 32, and connect the piston thereof with the disk 69 by means of a suitable connecting rod 79. This cylinder, as in the case of the cylinder 32, has its smaller end in open communication with the air supply tank 39 by means of the pipe 80. The large end of the cylinder 78 is connected with the tank 39 by means of a pipe 81, which is provided intermediate the tank 39 and the cylinder 78 with a valve 82, similar in construction to the valve 42 in the pipe 41. The arm 83 of the valve 82 is connected by means of a link 84 with one arm 85 of a bell crank lever which is pivotally connected to the frame of the machine at 86 and has its opposite arm 87 of considerably greater length than the arm 85 and extending downwardly to a point near the lower aeroplane, where it is provided with a suitable weight 88, thus forming a pendulum. Suitable stops 90 may be provided to regulate the motion of the pendulum. Under normal conditions the pendulum 87 is at substantially right angles to the aeroplanes and maintains the valve 82 in its closed position, thus holding the piston in the cylinder 78 against movement. But should one end of the machine rise to a higher level than the opposite end, as shown in Fig. 4, the pendulum 87 will swing toward the lower end of the machine, thus operating the valve 82 to admit pressure at one end of the piston and move the same longitudinally of the cylinder. Thus, through the medium of the connecting rod 79, and the disk 69, the drums 65 and 74 are rotated, thereby adjusting the opposite lateral portions of the aeroplanes and the vertical rudder 10 to such a position as to counteract the influence which is causing the aeroplanes to tilt and in that manner regulate the disturbances of balance about a vertical axis. The first swing of the pendulum is such as to carry the rudder and aeroplanes beyond the neutral point, and, consequently, the pendulum will swing back and reverse the position of these parts. These operations are successively repeated until the pendulum 87 loses its movement and comes to rest and the parts are held in their adjusted position so long as the machine maintains its lateral balance. If it is desired to drive the machine in a circle, the drum 74, which controls the vertical rudder and which is held in place on the axle 66 by friction only, may be turned to a new position on the axle 66 and thus set the vertical rudder at an angle to its normal position, and, with the parts thus reset, the automatic-controlling mechanism will operate then in exactly the same manner as when the machine is being driven forward in a straight line. We have also found it advisable to provide the several pipes leading from the cylinders to the air tank with flexible joints and connections, such as are shown at 89.

The fluid pressure cylinders 78 and 32 are here shown as mounted in vertical and horizontal positions respectively, but it will be obvious that the arrangement of these cylinders is immaterial and that they may be placed in any convenient position. Any suitable means may be provided for operating the balancing devices according to the movements of the automatic regulating vane, but we prefer the fluid-operated mechanism herein shown. Further, the automatic regulating or controlling vane 50 may be placed in any suitable position relatively to the aeroplanes and may be subjected to air pressure either on one side or on both sides, as in the present instance.

The operation of the device will be readily apparent from the description of the operation of the several parts and it will be apparent that we have provided automatic means, whereby the fore and aft balance of the machine may be maintained at a determined angle of incidence, and means whereby the angle of incidence at which the machine is automatically balanced may be varied at the will of the operator while the machine is in flight: and further, that we have provided automatic mechanism for maintaining the lateral balance of the machine, the automatic controlling mechanism being adapted to so adjust the angles of incidence of the opposite lateral portions of the aeroplanes and the position of the vertical rudder relatively to the aeroplanes as to restore the lateral balance of the machine if the same should be caused to tilt to one side or the other.

It will be understood that the automatic regulating mechanisms herein described may be applied to any form of flying machine having movable parts, and we wish it to be understood that we do not desire to be limited to the exact details of construction shown and described, for obvious modifications will occur to a person skilled in the art.

Having thus fully described our invention, what we claim as new and desire to secure by Letters Patent, is:—

1. In a flying machine, the combination, with an aeroplane constituting a supporting-surface and operable means for maintaining the balance thereof, of a vane adapted, as the machine advances, to be actuated by air currents, and means controlled by said vane when so actuated for operating said balancing mechanism.

2. In a flying machine, the combination, with an aeroplane constituting a supporting-surface and operable means for controlling the balance thereof, of a movable horizontal vane adapted to be actuated by air currents whenever the course of the machine varies from the plane of said vane, and means controlled by said vane for operating said balancing mechanism.

3. In a flying machine, the combination, with an aeroplane constituting a supporting-surface, and an adjustable rudder for maintaining the balance thereof, of a movable vane operatively connected to said rudder and adapted to be actuated by air currents.

4. In a flying machine, the combination, with an aeroplane constituting a supporting-surface, and an adjustable horizontal rudder for maintaining the fore and aft balance thereof, of a movable vane adapted to be actuated by air currents, and means controlled by said vane for operating said rudder.

5. In a flying machine, the combination, with an aeroplane constituting a supporting-surface, and an adjustable horizontal rudder for governing the inclination thereof, of a movable horizontal controlling vane adapted to be actuated by air currents which strike its upper or its lower side according as the angle of said currents to said aeroplane is less or greater than the angle of said vane to said aeroplane, and means controlled by said vane for operating said rudder.

6. In a flying machine, the combination, with an aeroplane, means for maintaining the balance thereof, and means for actuating said balancing mechanism, of a vane adapted to be actuated by air currents, movably mounted on said machine and operatively connected to said actuating mechanism, and means for varying the critical angle at which the balancing mechanism is actuated.

7. In a flying machine, the combination, with an aeroplane, means for maintaining the balance thereof, and means for actuating said balancing mechanism, of a vane adapted to be actuated by air currents movably mounted on said machine and operatively connected to said actuating mechanism by adjustable connections which permit the particular angle of incidence at which the aeroplane is automatically maintained to be changed.

8. In a flying machine, the combination, with an aeroplane, operable means for maintaining the balance thereof, and means for actuating said balancing mechanism, a horizontal vane adapted to be actuated by air currents and operatively connected to said balancing mechanism, of means for adjusting the angle between the vane and aeroplane without interrupting the operation of said automatic mechanism.

9. In a flying machine, the combination, with an aeroplane, means for maintaining the balance thereof, and means for actuating said balancing mechanism, of a horizontal vane movably mounted on said machine in such a manner that it can rise and sink without changing its angle with the aeroplane, and operatively connected to said actuating mechanism.

10. In a flying machine, the combination, with an aeroplane, means for maintaining the balance thereof, and means for actuating said balancing mechanism, of vertically extending arms pivotally connected to said machine, horizontally extending links pivotally connected to said arms, vertical members connecting the extremities of said links, a horizontal vane supported by said members, and means for operatively connecting said vane to said actuating mechanism.

11. In a flying machine, the combination, with an aeroplane, means for maintaining the balance thereof, and means for actuating said balancing mechanism, of a vane movably mounted on said machine and operatively connected to said actuating mechanism, means for adjusting the angle of said vane with said aeroplane, and means for securing the same in its adjusted position.

12. In a flying machine, the combination, with an aeroplane, means for maintaining the balance thereof, and a cable for operating said balancing mechanism, of a shaft supported on said aeroplane, a drum loosely mounted on said shaft and provided with a handle, a disk mounted on said shaft and having a recess in the periphery thereof, a dog carried by said handle and adapted to engage said recess, and means for positively rotating said disk.

13. In a flying machine, the combination, with an aeroplane, and operable means for maintaining the balance thereof, and a handle operatively connected with said means, of automatic mechanism for controlling the operation of said balancing mechanism, and means for making and breaking the connection between the automatic mechanism and the balancing mechanism.

14. In a flying machine, the combination, with an aeroplane having portions capable of facing forward at different angles of incidence on the right and left sides, and means of regulating resultant disturbances of balance about a vertical axis, of mechanism for adjusting said portions, and automatic means for controlling the action of said mechanism.

15. In a flying machine, the combination, with an aeroplane, and horizontal surfaces to the right and left of the center of the machine which can be adjusted to different angles of incidence for regulating the lateral balance, means for regulating resultant disturbances of balance about a vertical axis, and means for adjusting said surfaces, of a pendulum mounted on said machine and adapted to move transversely of the line of flight thereof, and means for operatively connecting said pendulum to both of said adjusting mechanisms.

16. In a flying machine, the combination, with an aeroplane, means for maintaining the lateral balance thereof, and cables for operating said balancing mechanism, of a plurality of drums mounted on said machine and adapted to engage said cables, means for actuating said drums in unison, and means for adjusting one of said drums relatively to the other.

17. In a flying machine, the combination, with an aeroplane, and means for maintaining the lateral balance thereof, of a fluid pressure cylinder comprising an enlarged portion and a reduced portion, the reduced portion being in open communication with the source of fluid supply, oppositely facing pistons within said cylinder adapted to move in unison and operatively connected to said balancing mechanism, a pipe connecting the enlarged portion of said cylinder to said source of fluid supply, a valve in said pipe, and means for automatically operating said valve.

18. In a flying machine, the combination, with an aeroplane, and means for maintaining the balance thereof, of fluid operated mechanism operatively connected to said balancing mechanism, and a vane for automatically controlling the admission of fluid to said fluid operated mechanism.

19. In a flying machine, the combination, with an aeroplane, and means for moving the right and left portions thereof about a transverse axis so as to face forward at different angles of incidence, and means for regulating resultant disturbances of balance about a vertical axis, of a pendulum mounted so as to move transversely of the line of flight, and operatively connected with one of said means so as to control the action thereof.

20. In a flying machine, the combination, with an aeroplane, and means for moving the right and left portions thereof about a transverse axis, so as to face at different angles of incidence, of a pendulum mounted so as to move transversely to the line of flight, and operatively connected with said means so as to control the action thereof.

21. In a flying machine, the combination, with an aeroplane having lateral portions capable of being twisted so as to face forward on the right and left sides at different angles of incidence, and means for producing said twists, of automatic means for controlling the twists of said aeroplane so as to keep the aeroplane in balance, operatively connected to said means for producing said twists.

22. In a flying machine, the combination, with an aeroplane, means for moving the right and left portions thereof about a transverse axis so as to face forward at different angles of incidence, and means for regulating resultant disturbances of balance about a vertical axis, of a pendulum mounted so as to move transversely to the line of flight and operatively connected with both of said means so as to control the action thereof.

23. In a flying machine, the combination, with an aeroplane constituting a supporting-surface, and means for maintaining the balance thereof, of a movable vane, and means regulated by the movement of said vane for operating said balancing mechanism.

24. In a flying machine, the combination, with an aeroplane constituting a supporting-surface, of a movable vane, and means controlled by the movement of said vane for regulating the angle of incidence of said aeroplane.

25. An aeroplane, including in combination a transversely extended planar member, means for moving its outer edges on either side out of the normal plane, connections between the edges on one side and on the other to cause them to have corresponding but opposite movements in order to impart to the aeroplane a tendency to rotate about its longitudinal axis, and means governed by the transverse inclination of the aeroplane to the horizontal for controlling said first-mentioned means.

26. The combination in a flying machine employing a flexible supporting plane, of means carried by said supporting plane and coöperating with the same to automatically twist said plane and change the angularity of portions thereof to the air pressure to restore equilibrium of the machine when the latter tilts.

27. A flying machine, having, in combination, an aeroplane of substantially rectangular form having an unbroken surface, elongated transversely to the line of flight, and automatic means for imparting to the opposite lateral end portions of said aeroplane a movement about an axis lying in the body of the aeroplane perpendicular to the lateral margins of said end portions, and thereby moving them to different angular relations to the normal plane of the body of the aeroplane.

28. A flying machine, having, in combination, an aeroplane normally flat and elongated transversely to the line of flight, and automatic means for imparting to said aeroplane a helicoidal warp around an axis transverse to the line of flight and extending centrally along the body of the aeroplane in the direction of its elongation.

29. A flying machine, having, in combination, parallel superposed aeroplanes, the opposite lateral end portions of each being capable of movement to different positions above or below the normal plane of the body of the aeroplane, such movement being about an axis transverse to the line of flight, whereby said lateral end portions may be moved to different angles relatively to the normal plane of the body of the aeroplane, and to different angles relatively to each other, so as to present to the atmosphere different angles of incidence, uprights connecting said aeroplanes at their edges by flexible joints, and automatic means for simultaneously imparting such movement to said lateral end portions, the upright maintaining a fixed distance between the parts which they connect, whereby the lateral end portions on the same side of the machine are moved to the same angle.

30. In a flying machine a steering surface and a controlling surface operatively connected with said steering surface, and means for adjustably mounting said controlling surface to permit the bodily movement thereof under the influence of air pressure.

31. In a flying machine a steering surface and a controlling surface operatively connected with said steering surface, a support for said controlling surface to permit the free movement thereof, and comprising guiding means to maintain said surface at a constant angle with respect to the horizontal, when the machine is in a normal horizontal position.

32. In a flying machine having a lifting plane, a steering surface, and a controlling surface operatively connected with said steering surface, said controlling surface being free to move bodily, and being guided to maintain definite angularity with respect to said lifting plane.

33. In a flying machine, a steering surface, and a controlling surface operatively connected with said steering surface, said controlling surface having a limited freedom of bodily movement, and means for operating said steering surface independently of said controlling surface.

34. In a flying machine, a steering surface, a controlling surface free to move bodily, means for operating said steering surface, and means for operatively connecting said controlling surface and said first-mentioned means.

35. In a flying machine, a steering surface, a controlling surface free to move bodily, means for manually operating said steering surface independently of said controlling surface, and means for adjustably connecting said controlling surface and said operating means.

36. In a flying machine, a steering surface, and a controlling surface operatively connected with said steering surface, said controlling surface being free to move and being guided to maintain a constant angle with respect to the horizontal when the machine is in a normal horizontal position, and means for adjusting said controlling surface to change its direction of movement.

37. In a flying machine, a steering surface, and a controlling surface operatively connected with said steering surface, said controlling surface being free to move and being guided to maintain a constant angle with respect to the horizontal when the machine is in a normal horizontal position, and means for adjusting said controlling surface to change said constant angle.

38. In a flying machine having a lifting plane, a steering surface, and a controlling surface operatively connected with said steering surface, said controlling surface being free to move bodily, and being guided to maintain definite angularity with respect to said lifting plane, and means for adjusting said controlling surface to change said definite angle.

39. In an aeroplane, a suitable framework at the rear thereof, a vertically disposed rudder plane mounted thereon, means actuated by gravity, and means connecting said rudder plane therewith, whereby said rudder plane is actuated automatically according to the position of the aeroplane in flight.

40. In a flying machine, a balancing apparatus comprising a horizontal plane, means to maintain the plane balanced under normal conditions, a horizontally pivoted rudder, and mechanism controlled by the movement of the plane when it becomes unbalanced to actuate the rudder.

41. An aeroplane including in combination a vane or plane movable so as to vary its angle of incidence with respect to air currents to control or affect the equilibrium of the aeroplane, manually operable means for moving said plane, automatic means for operating said plane, one of said operating means being capable of movement independently of the other of said operating means.

42. In a flying machine, the combination, with an aeroplane having portions capable of facing forward at different angles of incidence on the right and left sides, and automatically controlled means of regulating resultant disturbances of balance about a vertical axis, of mechanism for adjusting said portions, and automatic means for controlling the action of said mechanism.

In testimony whereof, we affix our signatures in presence of two witnesses.

ORVILLE WRIGHT.
WILBUR WRIGHT.

Witnesses:
C. E. TAYLOR,
LADOSKIE MILLER.